W. R. GRIBBIN & A. McMILLAN.
Automatic Clock-Operated Horse-Crib.
No. 160,092. Patented Feb. 23, 1875.
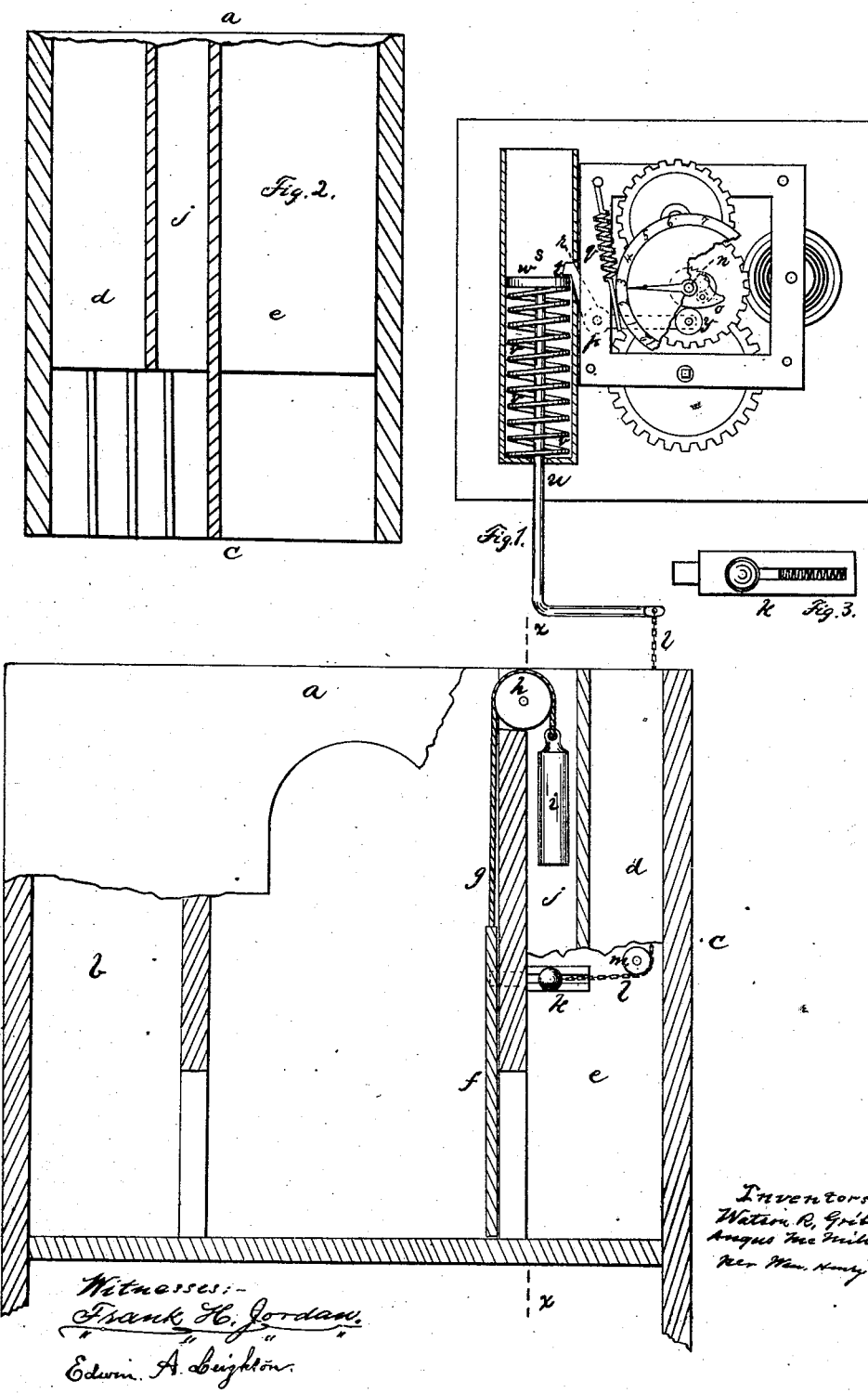

UNITED STATES PATENT OFFICE.

WATSON R. GRIBBIN AND ANGUS McMILLAN, OF PORTLAND, MAINE.

IMPROVEMENT IN AUTOMATIC CLOCK-OPERATED HORSE-CRIBS.

Specification forming part of Letters Patent No. 160,092, dated February 23, 1875; application filed November 13, 1874.

*To all whom it may concern:*

Be it known that we, WATSON R. GRIBBIN and ANGUS McMILLAN, both of Portland, in the county of Cumberland and State of Maine, have invented certain new and useful Improvements in Horse-Cribs; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a front view of our invention, showing the mechanism by which the slide is operated, parts broken out. Fig. 2 is an end view, illustrating the construction of our improved horse-crib, the same being taken in section on the line $x\ x$, Fig. 1. Fig. 3 is a detail, showing the catch for holding the slide.

Same letters show like parts.

The object of our invention is to produce an automatically-working horse-crib, the same being operated by mechanism similar to that of an ordinary alarm-clock, so that at a certain hour a catch will be released, a slide raised, and the feed for the horse exposed.

Our invention may be thus described: $a$ shows the crib; $b$, the compartment in which the animal is fed through during the day, the hay being pushed down from the loft above in the usual manner. $c$ shows a supplemental compartment, similar to $b$, save that it is divided into two chambers, $d\ e$, one for provender, the other for hay. $f$ shows a slide-door, working in guides on the inside of the crib, and operated by a cord, $g$, attached to its upper end, passing over a pulley, $h$, and having fastened to its opposite end the weight $i$, which works in the box $j$. $k$ shows a spring-catch attached to the inside of one of the chambers $d\ e$, so that when the slide $f$ is pushed down to cover the openings in the said chambers it will spring forward into a recess or cavity in the slide, and thus hold it in position. $l$ is a cord connected with this catch. This cord passes under the pulley $m$, and thence upward into the loft above. By drawing upon this cord the spring-catch $k$ is released from the slide, and the slide is caused to rise by the action of the weight $i$ in the box $j$, which weight is connected with said slide, as hereinbefore described.

During the day the horse is fed from the box or compartment $b$, and when it is desired to have the feed placed before him at a given hour without necessitating the stable-keeper to be present all that is necessary is to place the feed in the compartments $d\ e$—the slide $f$, of course, being drawn down—and to connect the cord $l$ with the clock-work mechanism, which we will next describe.

This machinery is similar, with the exception of the attachments we add, and which will be hereinafter described, to that of an ordinary alarm-clock, and so far needs no particular description here; but such mechanism as we add, and which constitutes part of our invention, we will now describe.

This mechanism is placed in a convenient frame in the loft above the stall. On the main shaft $n$ of the apparatus, to which the hands are attached, is a cam, $o$. To one side of the frame is pivoted a bell-crank lever, $p$. The inner end of this lever is kept pressed against the cam or eccentric $o$ by means of a small spiral spring, $q$, as shown in the drawing. The outer end of this lever works in a slot, $r$, in a cylinder, $s$, and is provided with a lip or projection, $t$. In this cylinder works a piston, $w$, which is drawn upward by the action of a spiral spring, $v$, surrounding its rod, said spring being placed between the head of the piston and the lower interior surface of the cylinder. The end of the lever $p$, which rests against the eccentric $o$, is provided with a truck or pulley, $y$, which enables this cam or eccentric to easily raise the lever as it revolves.

Having thus explained the nature and construction of our invention, we will now describe its operation: The piston-rod is first pulled down within the cylinder until the lip $t$ of the lever $p$ springs forward, by the action of the spring $q$, over the head of the piston. When in this position the spiral spring within the cylinder is contracted, so that when the piston is released it will throw it up with considerable force. When the piston is thus held down by the lip on the lever the cord $l$ is attached to the lower end of the piston-rod, and the index of the device set to indicate the hour when the piston shall be released, and as the eccentric revolves and arrives at the given point of time the inner end of the lever $p$ is raised by contact with it, and the lip $t$ drawn out from under the piston-head, thereby releasing it, and allowing it to spring up with considerable force. This movement draws upon the cord $l$, releases the catch $k$, and allows the feed in the compartments $d\ e$ to fall into the space in the crib in front of the animal.

It is evident that this arrangement may be connected with several stalls, so that they may all be operated at the same time and by suitable connections, only one apparatus being required to operate the whole.

It may be here remarked that the bottom of one of the compartments $d\ e$, intended for provender, such as corn, oats, &c., may slope or incline upwardly, so as to insure the ready descent of the same into the space in the crib in front of the animal when the slide is raised.

By having a trough or tank suitably arranged within one of the compartments $d\ e$ the horse can be watered when the slide is raised.

In Fig. 2 the slide $f$ and weight $i$ (illustrated in Fig. 1) are not shown, in order that the apertures in the compartments $d\ e$, which lead into the space in front of the animal, may be observed.

What we claim as our invention, and desire to secure by Letters Patent, is—

The crib $a$, having the compartments $d\ e$, the slide $f$, cord $g$, pulley $h$, weight $i$, catch $k$, and cord $l$, in combination with the piston $w$, lever $p$, spring $q$, and cam $o$, the whole being arranged to operate by mechanism similar to that of an ordinary alarm-clock, as and for the purposes set forth.

In testimony that we claim the foregoing as our own we affix our signatures in presence of two witnesses.

WATSON R. GRIBBIN.
ANGUS McMILLAN.

Witnesses:
FRANK H. JORDAN,
F. ELMORE JORDAN.